United States Patent Office 3,548,287
Patented Dec. 15, 1970

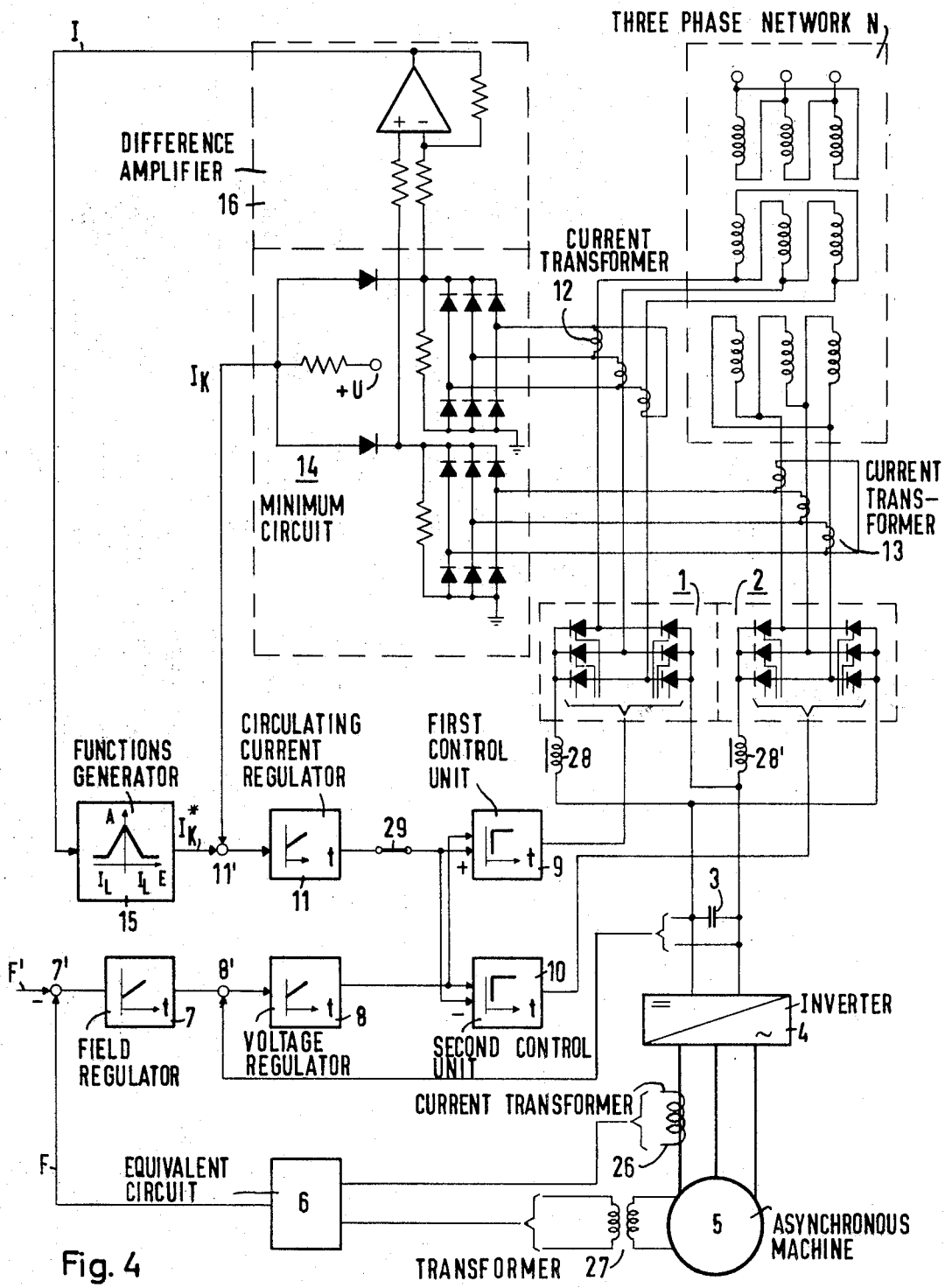

3,548,287
REGULATING CIRCUIT FOR THE FIELD OF AN ASYNCHRONOUS MACHINE
Felix Blaschke, Erlangen, and Gerhard Hütter, Maichingen, Germany, assignors to Siemens Aktiengesellschaft, Berlin and Munich, Germany, a corporation of Germany
Filed Jan. 28, 1969, Ser. No. 794,699
Claims priority, application Germany, Feb. 7, 1968, 1,638,650
Int. Cl. H02p 9/00
U.S. Cl. 322—24        6 Claims

ABSTRACT OF THE DISCLOSURE

A pair of controlled rectifiers for supplying energizing current to the field of an asynchronous machine are controlled by a control circuit. The control circuit comprises a first control unit connected to one of the control rectifiers and a second control unit connected to the other of the control rectifiers for determining the firing angles of the rectifiers. A voltage regulator is connected between the output electrodes of the rectifiers and the cotnrol units. A field regulator connected between the input to the machine and the voltage regulator compares a magnitude proportional to the air gap field of the machine and a reference field magnitude.

The present invention relates to a regulating circuit for an asynchronous machine. More particularly, the invention relates to a regulating circuit for the field of an asynchronous machine.

The asynchronous machine of the present invention is energized via a current converter comprising at least a pair of controlled rectifiers connected in reverse or opposite polarity. The current supplied to the field of the asynchronous machine is usually adjusted during the operation of rectifier and inverter systems by means of a current regulator for each controlled rectifier or group of controlled rectifiers, so that in such systems, current regulation is subordinated to field regulation. This results in undesirable temporary variations in voltage at a capacitor of the inverter circuit. The voltage variations are necessitated with variations in the load current which occur, for example, during the transition from motor-driven load current to generator-produced load current, and vice versa. During such load variations, the current regulator would maintain the rectifier constant during the first instant, and thereby counteract the reduction in standard deviation. This would thus support the natural rotary speed of the machine and thereby support the field breakdown. Only the variation in the field would then provide an adjustment of the rectifier current to the load current, and thereby provide control of the standard deviation. The adjustment of the rectifier current by the variation in the field would occur via the superimposed field regulator.

The field breakdown may actually be continued or controlled in time by a rapid operating field regulator. For stabilizing reasons, however, the speed of operation of the field regulator may generally not be selected high enough for this purpose. An object of the present invention is to obviate these difficulties by subordinating a voltage regulator to the field regulator in the control circuit of the controlled rectifiers. The magnitude of the output voltage of the voltage regulator thereby controls the firing or control of the controlled rectifiers.

The principal object of the present invention is to provide a new and improved regulating circuit for the field of an asynchronous machine.

An object of the present invention is to provide a regulating circuit for the field of an asynchronous machine, which regulating circuit is of simple structure, but reliable in operation.

An object of the present invention is to provide a regulating circuit for the field of an asynchronous machine, which regulating circuit operates with precision and effectively, efficiently and reliably.

In current converter systems which are operable as rectifier systems and inverter systems, regardless of whether they are cross type or antiparallel circuits, it has been proven to be advantageous to maintain that controlled rectifier which is not conducting the load current, and is controlled by the operation of the inverter, in constant contact with that controlled rectifier which is conducting the load current. This is achieved by utilizing a constant circulating current to control the controlled rectifiers. In order to avoid a gap current range which may be detrimental to the dynamics of the control, especially during the frequent changeover from rectifier operation to inverter operation, the magnitude of the constant circulating current should be selected at least sufficiently large so that it exceeds the gap current. In many controlled rectifier arrangements, the gap current is about 30% of the rated current, so that a considerable excess current load on the controlled rectifiers occurs during regulation or control of said rectifiers at a constant circulating current.

Another object of the present invention is to additionally influence the first and second control units provided for determining the firing angles of the controlled rectifiers by the output of a circulating current regulator. The rated value of the circulating current regulator is amplified at load currents smaller than the gap current, in accordance with the load current. This insures that at small load currents, the circulating current attains at least the level of the limit of the gap current, while at high load currents, the circulating current is reduced to a small magnitude. This prevents loading of the controlled rectifiers at considerable loads in excess of their rated value.

Another object of the present invention is to control the circulating current regulator in a particularly simple manner by means of a function generator. The function generator comprises a DC amplifier and a reversing amplifier connected to the output of said DC amplifier. A constant additional feedback is supplied to the reversing amplifier. The output of the reversing amplifier is limited to a minimum value by a diode connected in its output.

In accordance with the present invention, a regulating circuit for the field of an asynchronous machine comprises a source of energizing voltage. A pair of controlled rectifiers are connected in reverse polarity to each other and to the source of energizing voltage. Each of the controlled rectifiers has an output electrode, a control electrode and an input electrode connected to the source of energizing voltage. A coupling couples the output electrodes of the controlled rectifiers to the field of the asynchronous machine. A control circuit is connected to the source of energizing voltage, the coupling and between the output and control electrodes of the controlled rectifiers for controlling the operation of the controlled rectifiers. The control circuit comprises a first control unit connected to one of the controlled rectifiers. A second control unit is connected to the other of the controlled rectifiers. The control unit determines the firing angles of the controlled rectifiers. A voltage regulator is connected between the output electrodes of the controlled rectifiers and the first and second control units. A field regulator is connected between the coupling and the voltage regulator and compares a magnitude proportional to the air gap field of the asynchronous machine and a reference field magnitude.

The coupling comprises an inverter having inputs connected to the outputs of the controlled rectifiers and to the voltage regulator of the control circuit and outputs connected to the field of the asynchronous machine and to the field regulator of the control circuit. The control circuit further comprises a circulating current regulator connected between the source of energizing voltage and the first and second control units. The circulating current regulator comprises a reference load current with the smallest load current in the controlled rectifiers to affect the control of the operation of the controlled rectifiers when the load current is smaller than the gap current of the controlled rectifiers.

The control circuit further comprises a function generator coupled between the source of energizing voltage and the circulating current regulator for providing the reference load current to the circulating current regulator. The function generator of the control circuit comprises a DC amplifier having an output and an input coupled to the source of energizing voltage. A reversing amplifier has an input connected to the output of the DC amplifier and an output connected to the voltage regulator. A feedback connected to the reversing amplifier supplies a constant additional feedback to the reversing amplifier. A diode is connected to the output of the reversing amplifier for limiting the output of the reversing amplifier to a minimum value.

In order that the present invention may be readily carried into effect, it will now be described with reference to the accompanying drawings, wherein:

FIG. 4 is a partial block and a partial circuit diagram of the regulating circuit of FIG. 1.

In the figures, the same components are identified by the same reference numerals.

Figure 1:
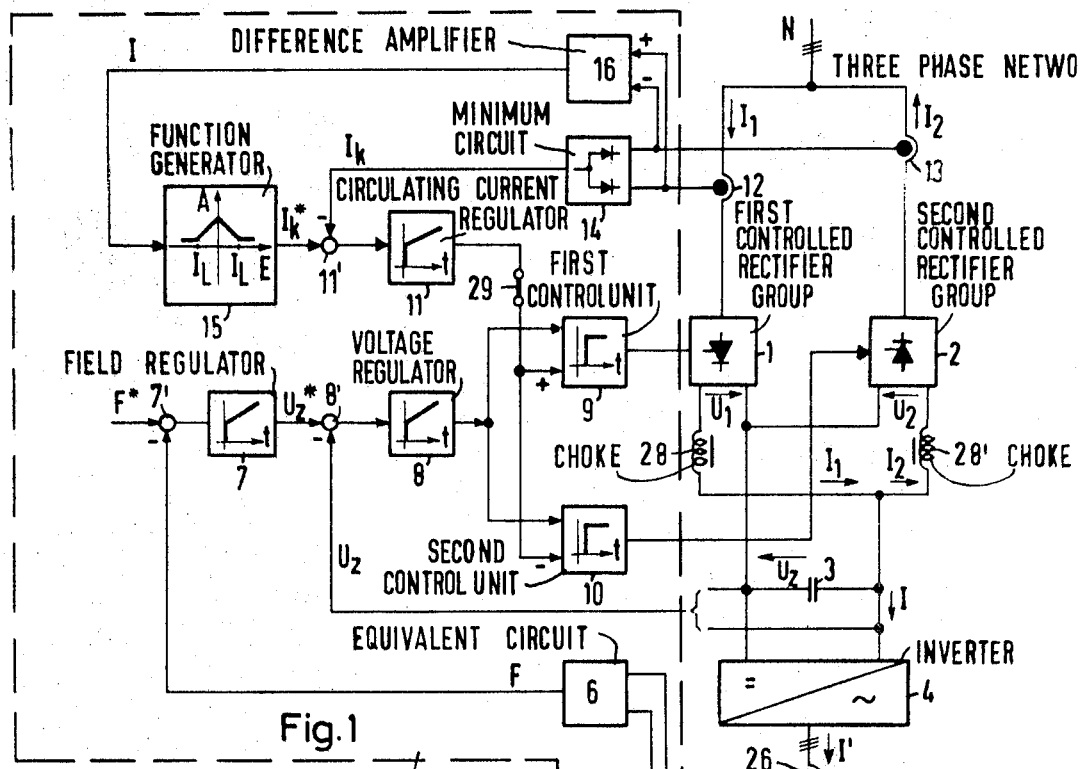
FIG. 1 is a block diagram of an embodiment of the regulating circuit of the present invention for the field of an asynchronous machine.

The regulating circuit of FIG. 1 functions as a rectifier or an inverter and comprises a first controlled rectifier or a first group of controlled rectifiers 1 and a second controlled rectifier or a second group of controlled rectifiers 2. Each of the controlled rectifiers may comprise any suitable type such as, for example, a semiconductor controlled rectifier or a silicon controlled rectifier, and may be identified as a thyristor. The controlled rectifiers 1 and 2 are connected in reverse or opposite polarity to each other and to a source of energizing voltage N, so that, for example, the anode or anodes of the first controlled rectifiers 1 are connected to one three-phase line and the cathode or cathodes of the second controlled rectifier or rectifiers are connected to another three-phase line and to the anodes of the first rectifier or rectifiers via a choke 28′, whereas the cathodes of said first rectifier or rectifiers are conected to the anodes of said second rectifier or rectifiers through a choke 28.

The controlled rectifiers of the first and second groups 1 and 2 are energized by the three-phase power source or network N. The first controlled rectifier or rectifier group produces a first output voltage $U_1$ and the second controlled rectifier or rectifier group produces a second output voltage $U_2$. The output voltages $U_1$ and $U_2$ are smoothed by the chokes 28 and 28′ connected to the output electrodes of the controlled rectifiers 1 and 2, respectively, and a capacitor 3 connected in common to said chokes. The chokes 28 and 28′ and the capacitor 3 function as the direct voltage intermediate circuit. The direct voltage intermediate circuit delivers a three-phase voltage to the field of the asynchronous machine 5 via an inverter 4.

The remainder of the regulating circuit of FIG. 1 is the control circuit for controlling the operation of the controlled rectifiers 1 and 2. An equivalent circuit 6, which is connected in common with the output of the inverter 4 and the input to the field of the asynchronous machine 5 via a current transformer 26 and a voltage transformer 27, produces a magnitude F proportional to the air gap field of said asynchronous machine. The equivalent circuit 6 produces its output signal F from the load current I′ of the asynchronous machine 5. The output F of the equivalent circuit 6 is compared with a rated or reference field magnitude F* at a point 7′ in the input of a field regulator 7.

The magnitude of the output of the field regulator 7 is the rated or reference magnitude or value for a subordinated voltage regulator 8. The actual voltage magnitude or value $U_z$ applied to the voltage regulator 8 is derived from the capacitor 3 of the intermediate circuit and is applied to a point 8′ in the input of said voltage regulator. The voltage $U_z$ is compared with the output voltage $U_z^*$ of the field regulator 7 at the point 8′. The output of the voltage regulator 8 energizes, triggers or controls a first control unit 9 and a second control unit 10. The first control unit 9 is connected to the control electrode of the first controlled rectifier or group of rectifiers 1 and determines the firing angle of said controlled rectifier or rectifiers. The second control unit 10 is connected to the control electrode of the second controlled rectifier or group of rectifiers 2 and determines the firing angle of said rectifier or rectifiers.

The first and second control units 9 and 10 may be additionally controlled or triggered by a circulating current regulator 11. The two currents $I_1$ and $I_2$ which flow from the three-phase network N to the input electrodes of the first and second rectifiers or rectifier groups 1 and 2 are supplied to the inputs of a minimum circuit 14 and a difference amplifier 16 via current transformers 12 and 13. The minimum circuit 14 derives a current magnitude $I_k$ from the two currents $I_1$ and $I_2$, which magnitude is the smaller of said two currents. The minimum circuit 14 supplies the current $I_k$ to a point 11′ in the input to the circulating current regulator 11. The difference amplifier 16 derives from the currents $I_1$ and $I_2$ an output current I which is the amplified difference between the magnitudes of said currents.

The output I of the difference amplifier 16 is supplied to the input of a function generator 15. The function generator provides a reference load current to the circulating current regulator. That is, the output current $I_k^*$ of the function generator 15 is supplied to the point 11′ in the input of the circulating current regulator 11, at which point said current is compared with the current $I_k$ provided by the minimum circuit 14. The current I supplied to the input of the function generator 15 corresponds to the load current of the D.C. intermediate circuit. The output current $I_k^*$ is the reference or rated magnitude or value of the circulating current regulator 11. When the load current I decreases below the magnitude of the gap current $I_L$ of the controlled rectifiers, the reference or rated current $I_k^*$ is amplified, compared to an otherwise negligible magnitude, up to the magnitude of said gap current. This is illustrated in the block representing the function generator 15 in FIG. 1 and in the graphical presentation of FIG. 3.

The output of the circulating current regulator is connected, via a switch 29, to inputs of the first control unit 9 and the second control unit 10. The circulating current regulator 11 thus functions to compare the reference load current $I_k^*$ with the smallest load current $I_k$ flowing in the controlled rectifiers 1 and 2 to affect the control of the operation of said controlled rectifiers when said load current is smaller than the gap current of the controlled rectifiers.

The current and voltage directions or polarities indicated in FIG. 1 illustrate an operational condition in which the controlled rectifier or rectifiers 1 function as a rectifier and the controlled rectifier or rectifiers 2 function as an inverter. The output voltage $U_1$ of the first rectifier or rectifiers 1 is thus greater than the capacitor voltage $U_z$ which in turn is greater than the output voltage $U_2$ of the second rectifier or rectifiers 2. If the load current becomes generator-produced, due, for example, to a change in the direction of the load, the direction of the load current I would reverse itself and the capacitor voltage $U_z$ would increase in magnitude.

An increase in the magnitude of the voltage $U_z$ of the capacitor 3 immediately functions, via the voltage regulator 8 of the control circuit, to control or vary the firing or operation of the controlled rectifiers 1 and 2 in a manner whereby the output current of the inverter 4 is absorbed by the controlled rectifier or rectifiers 2 and is therefore no longer effective in increasing the voltage of the DC intermediate circuit to an excessive magnitude. The voltage of the capacitor 3 and also the air gap field of the asynchronous machine 5 are thereby no longer subjected to dynamic breakdowns.

FIG. 4 is similar to FIG. 1, with the exception that in FIG. 4, the circuits of the three-phase network N, the current transformers 12, 13 and 26, the voltage transformer 27, the first and second groups of controlled rectifiers 1 and 2, the minimum circuit 14 and the difference amplifier 16 are shown. The current transformers 12 and 13 may also be of single-phase type. It is preferable to utilize a three-phase type, since such type effects a rectification of the output magnitude with few harmonic waves and the ends of the secondary windings may be connected to a three-phase bridge rectifier. The current supplied to the first and second groups of rectifiers 1 and 2 is provided by a secondary winding, connected in a triangle, of a three-phase transformer connected to the network N.

The equivalent circuit 6 may comprise any suitable field simulating circuit such as, for example, that disclosed in a pamphlet entitled, "AEG Mitteilungen 1964," pages 47–53, and especially FIG. 9 of page 53. This pamphlet points out that a current transformer and a voltage transformer, illustrated as the transformers 26 and 27, respectively, of FIGS. 1 and 4, are required in order to neglect the ohmic voltage drop of the stator winding, and that a direct voltage which is proportional to the air gap field is provided at the output of the equivalent circuit 6.

Each of the first and second units 9 and 10 may comprise any suitable control unit such as, for example, Siemens Aktiengesellschaft unit teb-p 4 se 305. The difference amplifier 16 may comprise any suitable difference amplifier such as, for example, that disclosed in the Siemens Zeitschrift, 1965, No. 8, pages 851–866, and especially FIG. 4 on page 858. FIGS. 2a and 2c on page 857 of this periodical illustrate the circuitry of the proportional integral regulator 7, 8, 11 of the control circuit. It is clear that such circuitry does not require special bridge circuits for providing the difference or comparison at the points 7', 8' and 11', but that such difference may be provided simply by a current summation via appropriate input resistors of the control amplifier.

Figure 3:
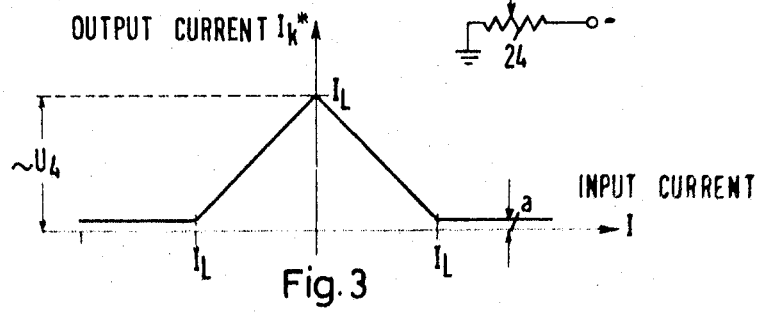
FIG. 3 is a graphical presentation illustrating the characteristic of the function generator of FIG. 2.

The minimum circuit 14 may comprise any suitable minimum circuit such as, for example, that described on pages 391 and 392, and especially FIG. 3.2/5 of "Taschenbuch der Nachrichtenverarbeitung," by Steinbuch, second edition, 1967, Springer-Verlag of Berlin, Heidelberg and New York.

Figure 2:
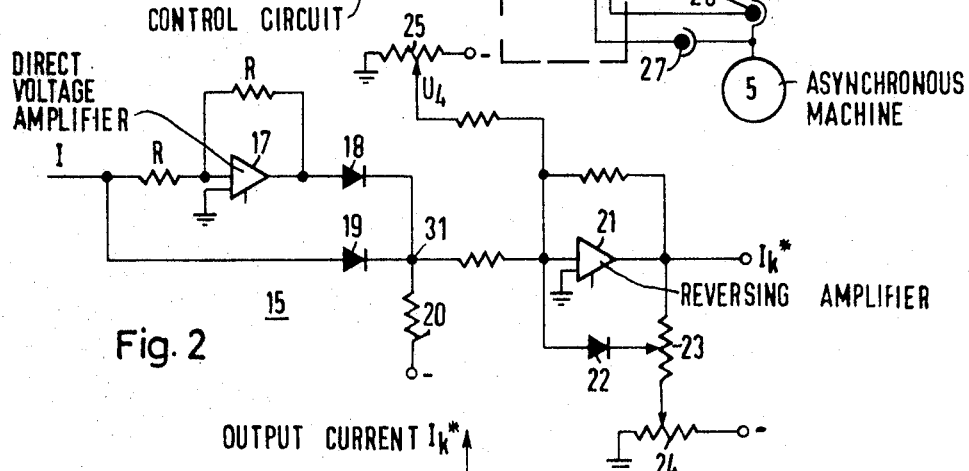
FIG. 2 is a circuit diagram of an embodiment of the function generator of the regulating circuit of FIG. 1.

FIG. 2 discloses a circuit which may be utilized as the function generator 15 of FIGS. 1 and 4. In FIG. 2, a direct voltage amplifier 17 has an amplification factor of one and a negative feedback circuit. The current I is supplied to the input of the DC amplifier 17 and is also supplied to the anode of a diode 19. The output current provided by the DC amplifier 17 is also supplied to the anode of a diode 18. The cathodes of the diodes 18 and 19 are connected in common to a common circuit point 31 and a resistor 20 is connected between said common circuit point and a source of negative DC voltage. There is always a positive potential at the common circuit point 31. The magnitude of the positive potential at the point 31 corresponds to the magnitude of the input current I to the DC amplifier 17. The potential at the circuit point 31 operates a reversing amplifier 21.

The reversing amplifier is a feedback DC amplifier. A constant additional feedback, which is derived from a negative voltage $U_4$, is supplied to the reversing amplifier 21. The magnitude of the output of the reversing amplifier 21 is limited by a diode 22, connected in a negative feedback path. When the diode 22 is conductive, it short-circuits the reversing amplifier 21 in its feedback path as soon as the magnitude of the output current $I_k^*$ of said reversing amplifier decreases below a specific minimum level. This level may be determined or adjusted or varied by potentiometers 23 and/or 24. The cathode of the diode 22 is connected to the movable electrode of the potentiometer 23. The potentiometer 24 is connected to a negative DC voltage source.

FIG. 3 illustrates the characteristic of the function generator of FIG. 2. In FIG. 3, the abscissa represents the input current I and the ordinate represents the output current $I_k^*$. The minimum output or starting magnitude a is determined as described with reference to FIG. 2, by adjustment of the potentiometers 23 and/or 24. The maximum magnitude $I_L$, which is the gap current of the controlled rectifiers 1 and 2, of the output current $I_k^*$, which occurs at a zero input current I, may be determined by the direct voltage $U_4$ derived from a potentiometer 25 (FIG. 2).

While the invention has been described by means of a specific example and in a specific embodiment, we do not wish to be limited thereto, for obvious modifications will occur to those skilled in the art without departing from the spirit and scope of the invention.

We claim:

1. A regulating circuit for the field of an asynchronous machine, comprising
 a source of energizing voltage;
 a pair of controlled rectifiers connected in reverse polarity to each other and to said source of energizing voltage, each of said controlled rectifiers having an output electrode, a control electrode and an input electrode connected to said source of energizing voltage;
 coupling means coupling the output electrodes of said controlled rectifiers to the field of said asynchronous machine; and
 control means connected to said source of energizing voltage, said coupling means and between the output and control electrodes of said controlled rectifiers for controlling the operation of said controlled rectifiers, said control means comprising a first control unit connected to one of said controlled rectifiers, a second control unit connected to the other of said controlled rectifiers, said control units determining the firing angles of said controlled rectifiers, a voltage regulator connected between the output electrodes of said controlled rectifiers and said first and second control units, and a field regulator connected between said coupling means and said voltage regulator for comparing a magnitude proportional to the air gap field of said asynchronous machine and a reference field magnitude.

2. A regulating circuit as claimed in claim 1, wherein said coupling means comprises an inverter having inputs connected to the outputs of said controlled rectifiers and to the voltage regulator of said control means and outputs connected to the field of said asynchronous machine and to the field regulator of said control means.

3. A regulating circuit as claimed in claim 1, wherein said control means further comprises a circulating current regulator connected between said source of energizing voltage and said first and second control units for comparing a reference load current with the smallest load current in said controlled rectifiers to affect the control of the operation of said controlled rectifiers when said load current is smaller than the gap current of said controlled rectifiers.

4. A regulating circuit as claimed in claim 3, wherein said control means further comprises a function generator coupled between said source of energizing voltage and said circulating current regulator for providing the reference load current to said circulating current regulator.

5. A regulating circuit as claimed in claim 4, wherein the function generator of said control means comprises a DC amplifier having an output and an input coupled to said source of energizing voltage, a reversing amplifier having an input connected to the output of said DC amplifier and an output connected to said voltage regulator and feedback means connected to said reversing amplifier for supplying a constant additional feedback to said reversing amplifier.

6. A regulating circuit as claimed in claim 5, wherein the function generator of said control means further comprises a diode connected to the output of said reversing amplifier for limiting the output of said reversing amplifier to a minimum value.

References Cited

UNITED STATES PATENTS 3,435,326   3/1969   Zechlin _____ 322—25

ORIS L. RADER, Primary Examiner

H. HUBERFELD, Assistant Examiner

U.S. Cl. X.R.

322—25, 28, 89, 94